United States Patent [19]
Formwalt

[11] 3,802,256
[45] Apr. 9, 1974

[54] FUEL WEIGHING SYSTEM
[75] Inventor: Charles William Formwalt, Cedar Falls, Iowa
[73] Assignee: Deere & Company, Moline, Ill.
[22] Filed: Apr. 10, 1972
[21] Appl. No.: 242,679

[52] U.S. Cl. ............................................. 73/113
[51] Int. Cl. ...................................... G01m 15/00
[58] Field of Search .......... 73/113, 114; 235/150.21

[56] References Cited
UNITED STATES PATENTS

| | | | |
|---|---|---|---|
| 3,683,684 | 8/1972 | Judlowe | 73/114 X |
| 3,448,609 | 6/1969 | Sibeud | 73/113 |
| 3,105,565 | 10/1963 | Pischinger | 73/113 X |
| 2,876,639 | 3/1959 | Loizzo et al. | 73/113 |
| 2,803,400 | 8/1957 | Hickey | 73/114 UX |
| 3,634,670 | 1/1972 | Judlowe | 73/114 UX |

Primary Examiner—Jerry W. Myracle

[57] ABSTRACT

A fuel weighing system for use in engine testing monitors the fuel consumption, load and speed of an engine to compute and provide readouts of engine horsepower, fuel consumption in pounds per hour, and brake specific fuel consumption in pounds per horsepower hour. The system operates in continuous cycles and assures an adequate integrating period for each cycle by monitoring the time needed to consume a sample of fuel and automatically selecting a smaller or larger fuel sample for the next cycle if the time needed to consume the sample is above or below, respectively, predetermined maximum or minimum time limits.

17 Claims, 5 Drawing Figures

FUEL WEIGHING SYSTEM

BACKGROUND OF THE INVENTION

The present invention relates generally to engine testing apparatus, and more specifically relates to a fuel weighing system for testing the brake specific fuel consumption of an engine.

When testing the operating characteristics of an engine, the brake specific fuel consumption is the best indication of the overall engine efficiency. In the past, the brake specific fuel consumption of an engine has been obtained by monitoring the load on the engine, the engine speed, and the time required for the engine to consume a known sample of fuel. These three measurements were then used to manually compute the brake specific fuel consumption. Because of the requirement to take readings from three different measuring devices, and make the manual calculations, it was very difficult to obtain the brake specific fuel consumption with any acceptable degree of accuracy. In the fuel weighing systems used to date, the operator selected a weight for use on a balance to determine the fuel sample size and this weight had to be manually changed if the operator wanted to vary the time required for the engine to consume the known fuel sample. Also, the fuel weighing systems used to date have been essentially a one-cycle operation requiring the operator to start each cycle.

SUMMARY OF THE INVENTION

One of the primary objects of the present invention is to provide a fuel weighing system which will automatically provide direct readouts of fuel consumption and which operates in continuous cycles without operator intervention.

Another object of the present invention is to provide a fuel weighing system which will provide a direct readout of brake specific fuel consumption.

Still another object of the present invention is to provide a fuel weighing system which operates in continuous cycles and assures an adequate integrating period for each cycle by monitoring the time needed to consume a sample of fuel and automatically selecting a smaller or larger fuel sample for the next cycle if the time needed to consume the sample is above or below, respectively, predetermined maximum and minimum time limits.

The above objects and additional objects and advantages of the present invention will become apparent to those skilled in the art from a reading of the following detailed description when taken in conjunction with the accompanying drawings.

DESCRIPTION OF THE PREFERRED EMBODIMENT

Figure 1A:
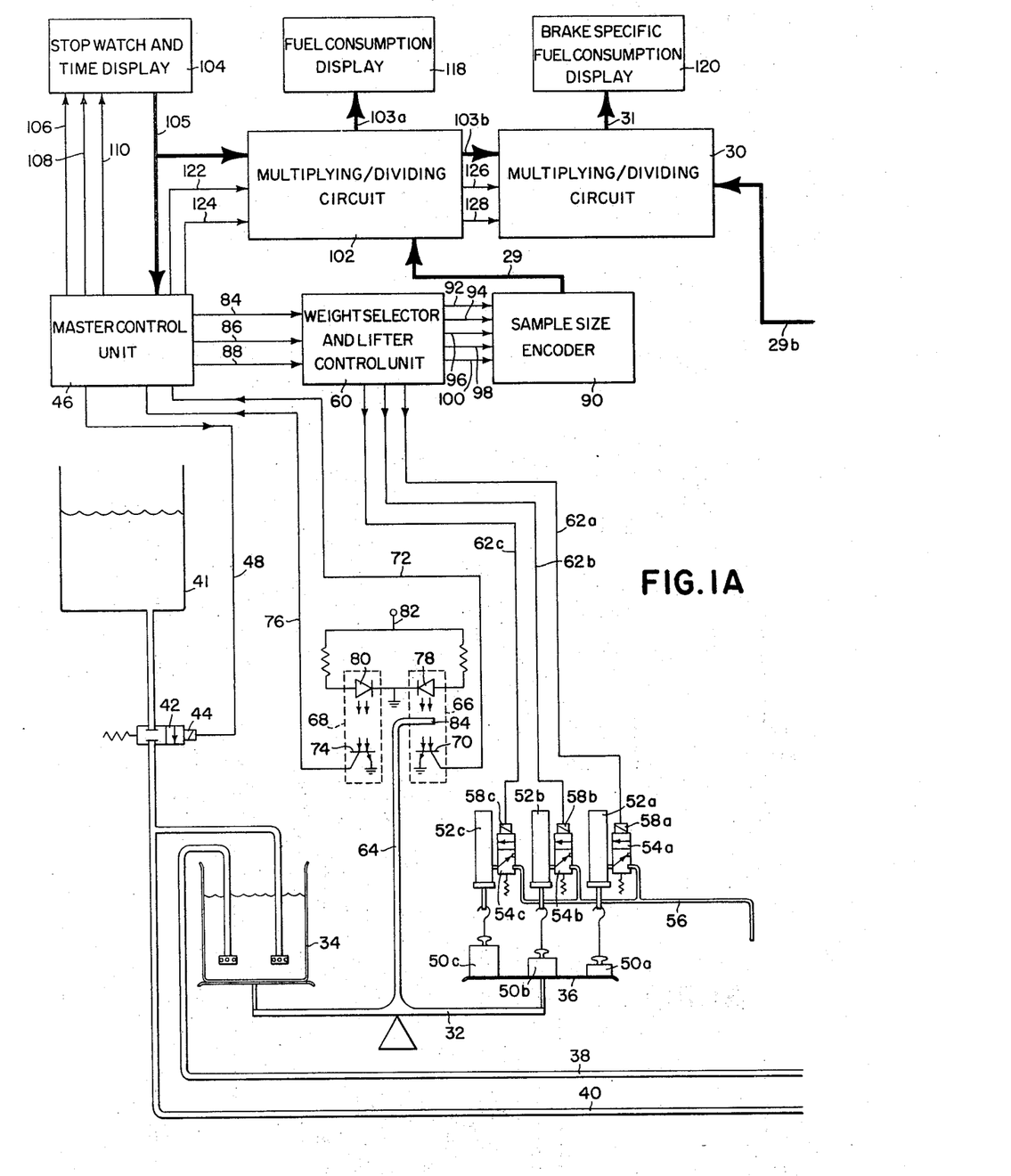
FIGS. 1a and 1b, taken together, are a schematic illustration of the fuel weighing system according to the present invention.
Figure 1B:
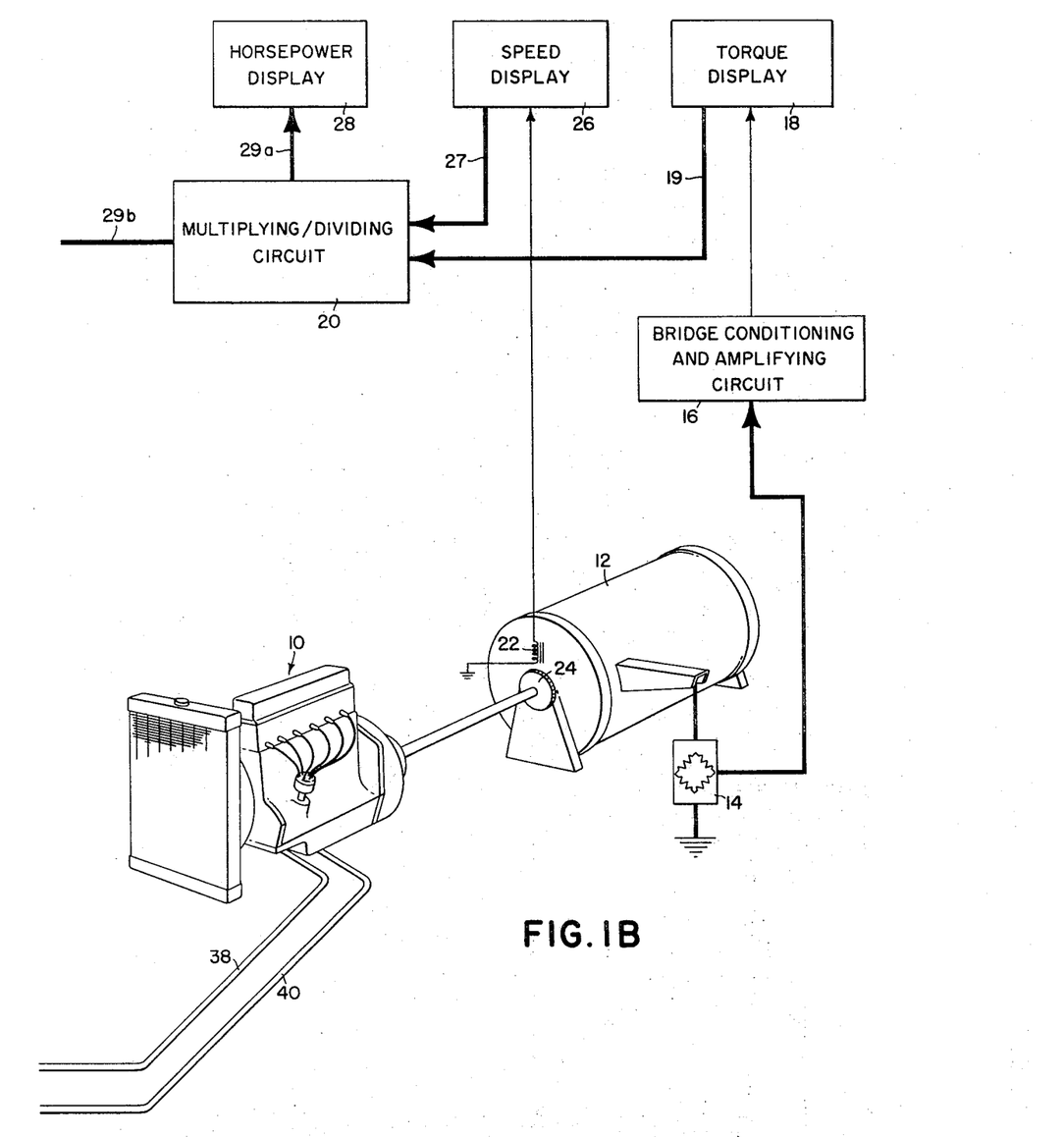

Referring to the drawings, and particularly to FIG. 1, the fuel weighing system according to the present invention is illustrated as being connected to an internal combustion engine 10 and a dynamometer 12. The load imposed on the engine 10 by the dynamometer is sensed by a load cell 14 and goes through conditioning and amplifying circuitry 16 to a digital voltmeter 18. The digital voltmeter provides a digital display of torque and a binary coded decimal output 19 to a digital multiplying and dividing circuit 20.

A magnetic pickup head 22 senses the revolutions of a gear 24 on the shaft interconnecting the engine with the dynamometer and provides the input to a digital frequency counter 26. The digital frequency counter provides a display of engine speed in rpm and also provides a binary coded decimal output 27 to the digital multiplying and dividing circuit 20. The digital multiplying and dividing circuit 20 utilizes the binary coded decimal outputs of the digital voltmeter and frequency counter to compute engine horsepower and provides binary coded decimal outputs 29a and 29b to a digital horsepower display unit 28 and an additional digital multiplying and dividing circuit 30.

The fuel weigher includes a knife edge balance 32 having a fuel container 34 on one side and a weight-receiving table 36 on the other. The fuel container 34 is connected to the engine 10 by a pair of fuel lines 38 and 40, the fuel line 38 being a return line and the fuel line 40 a supply line. The return line 38 is only needed when testing diesel engines to provide for the return of fuel which has leaked around the nozzles and fuel used for cooling. The fuel line 40 is also connected to a fuel reservoir or storage tank 41 through a normally closed valve 42 which is opened by activation of a solenoid 44. The solenoid 44 is connected to a master control unit 46 by a lead 48.

A plurality of different size weight members 50a, 50b and 50c are placed on the table 36 and each is connected to a pneumatic lift cylinder 52a, 52b and 52c respectively. The lift cylinders 52 are connected through valves 54a, 54b and 54c to a common air line 56 leading to a source of air pressure (not shown). The valves 54 normally vent the lift cylinders 52 to the atmosphere but are moved to a position connecting the lift cylinders with the air line 56 by solenoids 58a, 58b and 58c which are connected to a weight selector and lifter control unit 60 by leads 62a, 62b and 62c.

The balance 32 includes an indicator finger 64 which controls a balance sensor 66 and a container down or imbalance sensor 68. The balance sensor 66 includes a photosensitive transistor 70 which has its emitter connected to ground and its collector connected to the master control unit 46 by a lead 72. The imbalance sensor 68 includes a photosensitive transistor 74 having its emitter connected to ground and its collector connected to the master control unit 46 by a lead 76. The necessary bias to turn on or saturate the transistors 70 and 74 is provided by light emitting diodes 78 and 80, respectively, which are connected between ground and a lead 82 connected to an electrical source. The balance indicator finter finger includes an upper offset portion 84 which will move between the photosensitive transistors and light emitting diodes to break the light beam and turn off or cut off the transistors as the balance and imbalance conditions are established.

The weight selector and lifter control unit 60 is connected to the master control unit 46 by leads 84, 86 and 88 which are used to transfer lift weights, count-up and count-down signals, respectively, from the master control unit to the weight selector and lifter control unit as will be more fully explained hereinafter. The weight selector and lifter control unit 60 is connected to a sample size encoder 90 by leads 92, 94, 96, 98 and 100 which transfer sample size signals from the weight selector and lifter control unit 60 to the sample size encoder 90. With the three different size weights 58a, 58b and 58c which may be, for example, ¼ lb., ½ lb. and 1-½ lbs., respectively, it is possible to obtain seven different weight combinations. Only five of these combinations are utilized and the leads 92-100 are used to transfer a signal to the encoder to indicate to the encoder which weight combination is utilized, with the lead 92 providing the signal for the smallest weight combination or ¼ lb. and the lead 100 providing the signal for the largest weight combination or 2-¼ lbs. The sample size encoder receives the incoming signal, encodes the incoming signal, and provides a binary coded decimal output 91 to a digital multiplying and dividing circuit 102.

A digital stop watch 104 providing a time display is interconnected with the master control unit 46 by leads 106, 108 and 110 which transfer start, stop and reset signals, respectively, from the master control unit to the digital stop watch. The digital stop watch provides a binary coded decimal 105 output back to the master control unit and to the digital multiplying and dividing circuit 102.

The binary coded decimal output from the digital stop watch back to the master control unit is for the purpose of monitoring the time needed to consume a sample of fuel to assure that the needed time is within predetermined minimum and maximum limits. For example, it has been determined that a minimum of 40 seconds integrating time is required to assure acceptable accuracy when weighing the fuel consumption of a reciprocating internal combustion engine. At the same time, integrating periods over 60 seconds do not appear to significantly improve the accuracy. By keeping the integrating period between these limits, acceptable accuracy is obtained within a minimum of time. However, and by way of example only, the maximum time limit can be increased to 90 seconds so that the maximum time limit is equal to or greater than twice the minimum time limit so that there is always a combination of weight members to provide a fuel sample which will be consumed within the time limits. For example, if it takes 91 seconds to consume 1-½ lbs. of fuel, a combination of the ½ and ¼ lb. weights should provide a fuel sample which will be consumed within the 40 and 90 second minimum and maximum time limits.

To monitor the time for the minimum and maximum limits of 40 and 90 seconds, only three leads 112, 114 and 116 are required to provide a signal through lead 116 when the tens column of the digital stop watch reaches one, through lead 112 when the tens column of the digital stop watch reaches four, and through the lead 114 when the tens column of the digital stop watch reaches eight. With this arrangement, a signal will be provided through the lead 116 between 10 and 19 seconds, and 30 and 39 seconds, a signal will be provided through the lead 112 between 40 and 79 seconds, a signal will be provided through the lead 114 between 80 and 89 seconds and a signal will be provided through both the leads 114 and 116 at 90 seconds and above.

The digital multiplying and dividing circuit 102 receives the binary coded decimal outputs 105 and 29 from the digital stop watch and sample size encoder and uses these signals to compute fuel consumption in pounds per hour and uses this result to provide a binary coded decimal output 103a and 103b to a fuel consumption display unit 118 and the digital multiplying and dividing circuit 30. The digital multiplying and dividing circuit 30 receives the horsepower binary coded decimal output 29b from the digital multiplying and dividing circuit 20 and the fuel consumption binary coded decimal output 103b from the digital multiplying and dividing circuit 102 and uses these signals to compute brake specific fuel consumption in pounds per horsepower hour and provide a binary coded decimal output 31 of the results to a brake specific fuel consumption display 120.

The digital multiplying and dividing circuit 20 is self-cycling to provide an unbroken sequence of output signals to the digital multiplying and dividing circuit 30 and the horsepower display, whereas the digital multiplying and dividing circuits 30 and 102 require a start signal before they will compute and are also set up to be responsive to a blanking or reset signal to reset back to zero. To this end, the digital multiplying and dividing circuit 102 is connected with the master control unit 46 by leads 122 and 124 to transfer the compute and reset signals from the master control unit to the digital multiplying and dividing circuit 102. The compute and reset signals are transferred from the digital multiplying and dividing circuit 102 to the digital multiplying and dividing circuit 30 by leads 126 and 128 respectively.

Figure 3A:
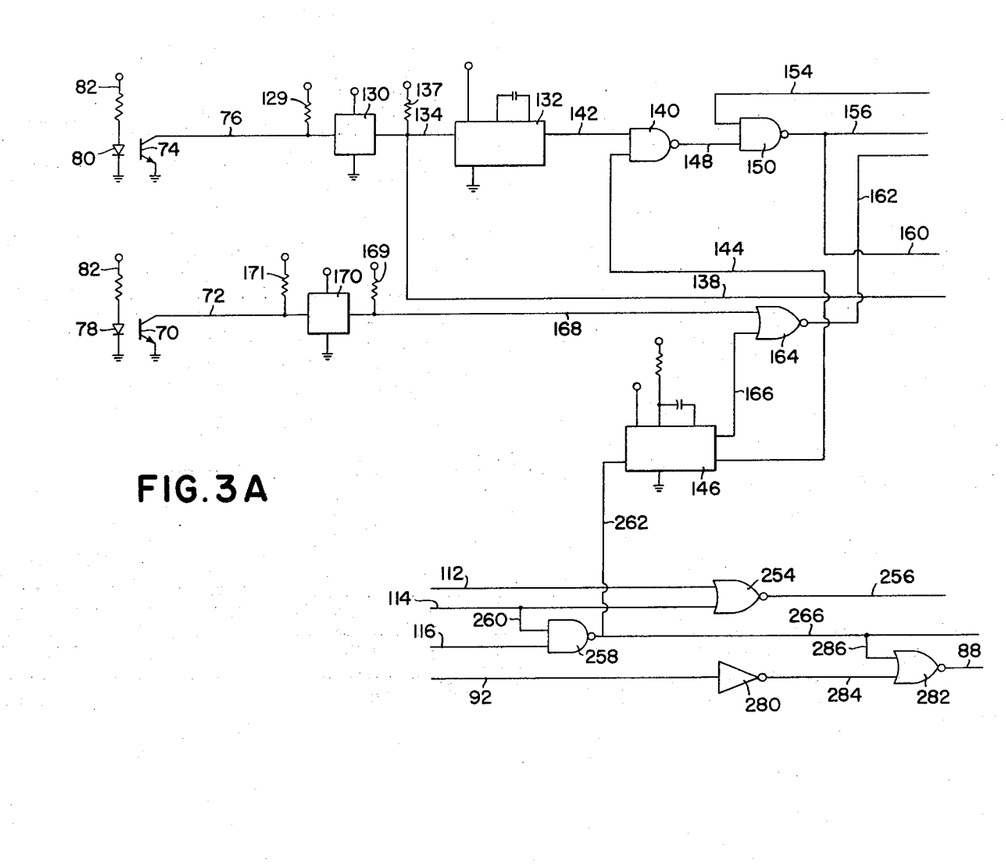
Figure 3B:
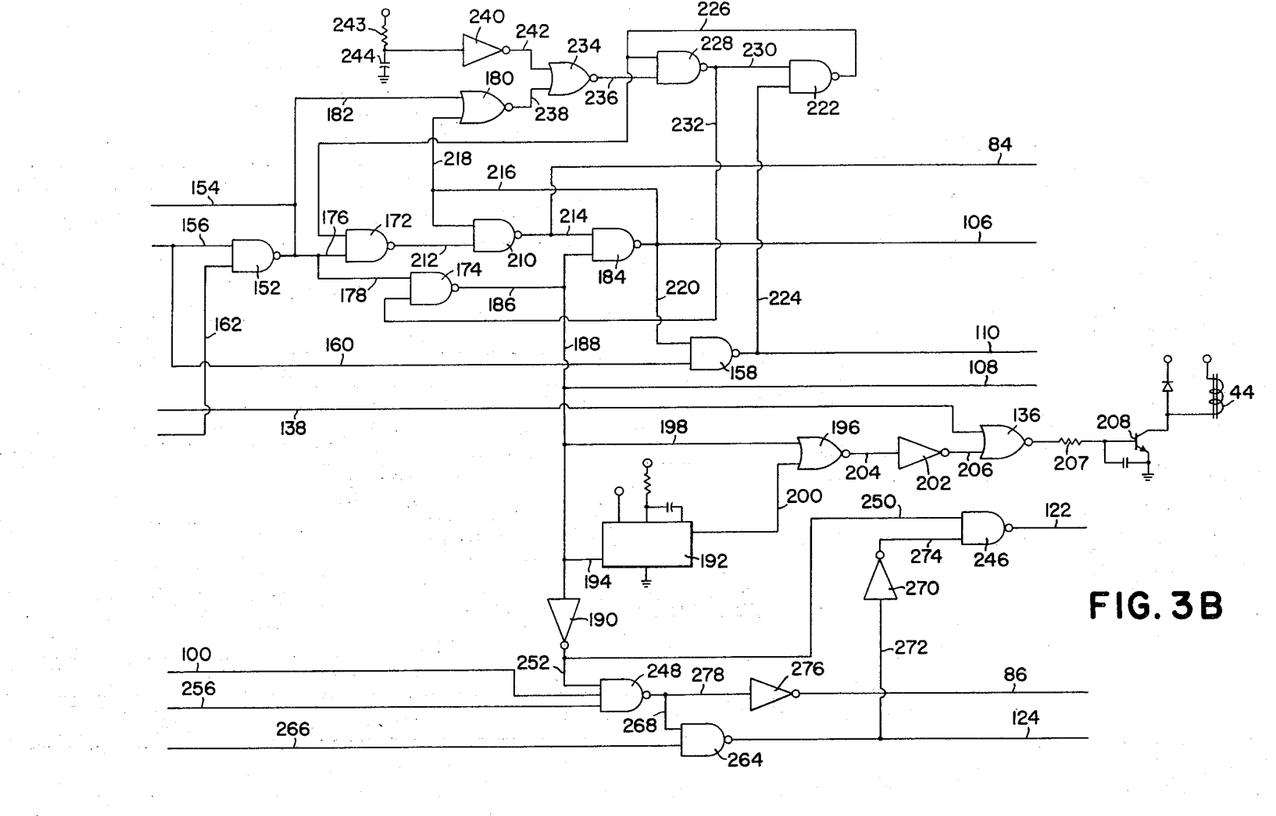

The circuitry for the master control unit 46 is schematically illustrated in FIGS. 3a and 3b. As illustrated in FIG. 3, the lead 76 for the imbalance sensor is connected to a positive voltage source through a resistor 129 and to a Schmidt trigger 130. The Schmidt trigger 130 is also connected to the input of a monostable multivibrator 132 by a lead 134. The transition of the input to the monostable multivibrator 132 from a logical zero to a logical one triggers the monostable multivibrator to provide a logical one output of a preset duration. The lead 134 is also connected to a positive voltage source through a resistor 137 and to a nor gate 136 by a lead 138. The monostable multivibrator is also connected to one input of a nand gate 140 by a lead 142. A second input to the nand gate 140 is connected by a lead 144 to one output of a monostable multivibrator 146. The output of nand gate 140 is connected through lead 148 to one input of a nand gate 150. The second input for the nand gate 150 is connected to the output of a nand gate 152 by a lead 154. The output of nand gate 150 is connected by lead 156 to one of the inputs of nand gate 152. The lead 156 is also connected to one input of a nand gate 158 by a lead 160. The second input for the nand gate 152 is connected by a lead 162 to the output of a nor gate 164. One input of the nor gate 164 is connected to a second output of the monostable multivibrator 146 by a lead 166. The second input of the nor gate 164 is connected by lead 168 in parallel with a positive voltage source through a resistor 169 and one side of the Schmidt trigger 170 which has its opposite side connected to a positive voltage source through a resistor 171 and also to the balance sensor by lead 72.

The output of nand gate 152 is also connected to one input of each of a pair of nand gates 172 and 174 by leads 176 and 178 respectively, and to one input of a nor gate 180 by a lead 182. The output of nand gate 174 is connected to one input of a nand gate 184 by leads 186 and 188, to the input of an inverter 190 by the leads 186 and 188, to the input of a monostable multivibrator 192 by the leads 186, 188 and a lead 194, to one input of a nor gate 196 by the leads 186, 188 and a lead 198, and by the leads 186 and 188 to the lead 108 which provides a stop signal to the digital stop watch 104. A logical zero output from the nand gate 174 provides the proper signal through the lead 108 to stop the digital stop watch which will remain stopped unitl it receives the proper start signal through th lead 106.

The output of the monostable multivibrator 192 is connected to the second input of the nor gate 196 by a lead 200 and the output of the nor gate 196 is connected to the input of an inverter 202 by a lead 204. The output of inverter 202 is connected to the second input of nor gate 136 by a lead 206 and the output of nor gate 136 is connected through a resistor 207 to the base of a transistor 208 which has its emitter connected to ground and its collector connected to a positive voltage source through the solenoid 144. With this arrangement, it can be seen that a logical one output from the nor gate 136 turns on or saturates the transistor 208 to activate the solenoid 44 and open the valve 42 to fill the container 34 with fuel from the reservoir 41. The monostable multivibrator 192 provides a timed delay so that the solenoid 44 is not activated until the expiration of a short period after the proper logic output is provided by the nand gate 174.

The output of nand gate 172 is connected to one input of a nand gate 210 by a lead 212 and the output of nand gate 210 is connected to the second input of nand gate 184 by a lead 214. The output of nand gate 184 is connected to the lead 106 which provides the start signal to the digital stop watch 10. A logical zero output from the nand gate 184 starts the digital stop watch which continues to run until the nand gate 174 provides a logical zero output to provide the stop signal to the digital stop watch through the lead 108.

The lead 84, which provides the lift weights signal to the weight selector and lifter control unit, is connected to the lead 214 between the nand gates 210 and 184, and provides the proper lift signal to the weight selector and lifter control unit when the output from nand gate 210 is a logical one. As will be explained hereinafter, the weight selector and lifter control unit will raise the selected weights upon the receipt of the logical one signal and will retain the weights in the raise position until the nand gate 210 provides a logical zero output.

The output of nand gate 184 is also connected to the second input of the nand gate 210 by a lead 216 and to the second input of the nor gate 180 by a lead 218. The output of nand gate 184 is further connected to the second input of the nand gate 158 by a lead 220 and the output of the nand gate 158 is connected to one input of a nand gate 222 by a lead 224 and also to the lead 110 which will carry the reset signal to the digital stop watch 104. A logical zero output from the nand gate 158 provides the proper signal in the lead 110 to reset the digital stop watch.

The output of nand gate 222 is connected by lead 226 to one input of a nand gate 228 and to the second input of the nand gate 172. The output of nand gate 228 is connected to the second input of nand gate 222 by a lead 230 and to the second input of nand gate 174 by a lead 232. The second input of the nand gate 228 is connected to the output of a nor gate 234 by a lead 236. The inputs for the nor gate 234 are connected to the output of the nor gate 180 by a lead 238 and the output of an inverter 240 by a lead 242. The input of the inverter 240 is connected through a resistor 243 to a positive voltage source and to ground through a capacitor 244. Inverter 240 assures that the circuitry is set up to start at the beginning of a cycle as soon as the power is turned on.

The output of the inverter 190 is connected to one input of each of a pair of nand gates 246 and 248 by leads 250 and 252 respectively. A second input of the nand gate 248 is connected to the output of a nor gate 254 by a lead 256, and a third input for the nand gate 248 is connected to the sample size signal lead 100. The signal in the sample size signal lead 100 is a logical zero when all the weights are lifted and, as will be apparent from a study of the overall circuit, conditions the circuitry to permit a compute signal to be generated if all the weights have been lifted and it still takes less than the selected 40 seconds for the engine to consume the fuel sample.

The inputs for the nor gate 254 are connected to the leads 112 and 114 which provide the four and eight signals of the binary coded decimal output from the digital stop watch 104 to the master control unit. As explained earlier, the signal in the lead 112 will be a logical one anytime the digital stop watch is between 40 and 79 seconds and the signal in lead 114 will be a logical one whenever the digital stop watch is between 80 and 99 seconds.

The lead 114 is also connected to one input of a nand gate 258 by a lead 260 and the second input of the nand gate 258 is connected to the lead 116 which provides the one signal of the binary coded decimal output of the digital stop watch 104 to the master control unit. The output of nand gate 258 is connected to the input of the monostable multivibrator 146 by a lead 262. The output of the nand gate 258 will be a logical one as long as less than 90 seconds have been recorded on the digital stop watch. However, as soon as 90 seconds have been recorded on the digital stop watch, both the leads 114 and 116 will carry a logical one which will provide a logical zero output from the nand gate 258. The transition from a logical one to a logical zero at the input of the monostable multivibrator 146 triggers the monostable multivibrator 146 to change the logical output through the lead 144 from a normal logical one to a logical zero for a predetermined duration and to change the logical output through the lead 166 from a normal logical zero to a logical one for a predetermined duration. As will be apparent from a study of the overall circuitry, the triggering of the monostable multivibrator 146 conditions the circuitry to start the next cycle prior to the time when the engine has consumed the entire fuel sample.

The output of the nand gate 258 is also connected to one input of a nand gate 264 by a lead 266 and the second input for the nand gate 264 is connected to the output of the nand gate 248 by a lead 268. The output of nandgate 264 is connected to lead 124 which provides the nand gate signal to the digital multiplying and dividing circuits 102 and 30. The proper signal for resetting the digital multiplying and dividing circuits 102 and 30 is provided by the transition from a logical zero output from the nand gate 264 to a logical one output from the nand gate 264.

The input of an inverter 270 is connected to the output of the nand gate 264 by a lead 272 and the lead 124, and the output of the inverter 270 is connected to the second input of nand gate 246 by a lead 274. The output of nand gate 246 is connected to the lead 122 which provides the compute signal to the digital multiplying and dividing circuits 102 and 30. The proper compute signal is provided to the digital multiplying and dividing circuits 102 and 30 by the transition from a logical one output from the nand gate 246 to a logical zero output from a nand gate 246.

The output of nand gate 248 is also connected to the input of an inverter 276 by a lead 278, and the output of nand gate 276 is connected to the lead 86 which provides the count-up signal to the weight selector and lifter control unit. A positive going pulse through the lead 86 to the weight selector and lifter control unit causes the weight selector and lifter control unit to lift the next larger combination of weights for the next cycle.

The sample size signal line 92, in addition to carrying a signal from the weight selector and lifter control unit to the sample size encoder also provides an input to the master control unit and is connected to the input of an inverter 280 which has its output connected to one input of a nor gate 282 by a lead 284. The second input of the nor gate 282 is connected to the lead 266 by a lead 286, and the output of nor gate 282 is connected to the lead 88 which carries the count-down signal from the master control unit to the weight selector and lifter control unit. A positive going pulse to the weight selector and lifter control unit through lead 88 causes the weight selector and lifter control unit to lift the next smaller combination of weights for the next cycle.

The operation of the master control unit is essentially as follows. When the power is turned on, the inverter 240 and its inputs ensures a logical zero signal in the lead 84 so that the weights are lowered and the balance indicator finger blocks the light beam from the photosensitive transistor 70 of the balance sensor 66. The circuitry will then be conditioned to provide a logical one output from the nor gate 136 which turns on or saturates the transistor 208 and activates the solenoid 44 so that fuel runs from the reservoir 41 to the fuel container 34 on the balance 32. At the same time, there is a one logical signal in the leads 106 and 110 and a zero logical signal in the lead 108 which stops the digital stop watch 104. As soon as sufficient fuel has run into the container 34 to create an imbalance, the balance indicator finger 64 swings over to block light from the photosensitive transistor 74. This conditions the circuitry to provide a logical zero output from the nor gate 136 which deactivates the solenoid valve 44, to change the signal in the lead 108 to a logical one, and to change the signal in the lead 110 to a logical zero which resets the digital stop watch 104.

As the engine continues to use fuel, a balance will again be established between the fuel and weights so that the balance indicator finger 64 blocks the light from the photosensitive transistor 70. This conditions the circuitry to provide a logical one in the lead 84 so that the selected weights are raised, to provide a logical zero in the lead 106 so that the digital stop watch is started and to provide a logical one in the lead 110 to remove the reset signal. When the weights are lifted, the beaker again goes down so that the balance indicator finger 64 blocks the light from the photosensitive transistor 74 which conditions the circuitry to stop the stop watch 104 on the next balance indication.

When the engine has consumed the entire fuel sample whose size is determined by the weights which have been removed from the table 36, a balance is again established so that the balance indicator finger 64 blocks the lights from the photosensitive transistor 70 which conditions the circuitry to provide a logical zero in the lead 84 so that the weights are lowered, to provide a logical zero in the lead 108 to stop the digital stop watch, to provide the negative transition in the lead 122 to provide the compute signal to the digital multiplying and dividing circuits 102 and 30, if appropriate as explained hereinafter, and to provide the proper output from the nand gate 174 which eventually provides the needed logical one output from nor gate 136 to trigger the transistor 208 and activate the solenoid 44. However, the monostable multivibrator 192 delays the signal from the nand gate 174 a predetermined time to ensure that the weights have been lowered before fuel again begins to run into the container 34 from the reservoir 41. At the end of the delay provided by the monostable multivibrator 192, the circuitry is conditioned to the start of another cycle.

If, during any cycle, 90 seconds elapse before the engine has consumed its entire fuel sample, logical one signals will immediately appear in the leads 114 and 116 which change the output of the nand gate 158 from a logical one to a logical zero. This transition triggers the monostable multivibrator 146 which conditions the circuitry to the start of a new cycle. The logical ones in the leads 114 and 116 also condition the circuitry to provide a count-down signal in the lead 88 so that the next smaller combination of weights is raised during the next cycle, and further provides a blanking or reset signal in the lead 124 so that the operator, upon seeing the container 34 being refilled, will not take an erroneous reading. If the smallest weight was raised during the last cycle, the logical zero in the sample size signal lead 92 will disable or block the count-down signal.

If, at the end of any cycle, less than the selected 40 seconds have elapsed, the logical zero in both the leads 112 and 114 conditions the circuitry to block the compute signal from the lead 122, provide a blanking or reset signal in the lead 124, and provide a count-up signal in the lead 86. However, if the largest combination of weights was raised during the last cycle, a logical zero in the sample size signal lead 100 disables or blocks the count-up signal from the lead 86 and conditions the circuitry to provide the compute signal in the lead 122.

In the foregoing description of operation of the master control unit, the logical inputs and outputs of most of the various gates have been omitted for brevity since, with the various given inputs and outputs of the master control unit, the inputs and outputs of the various gates will be obvious to those skilled in the art.

Figure 2:
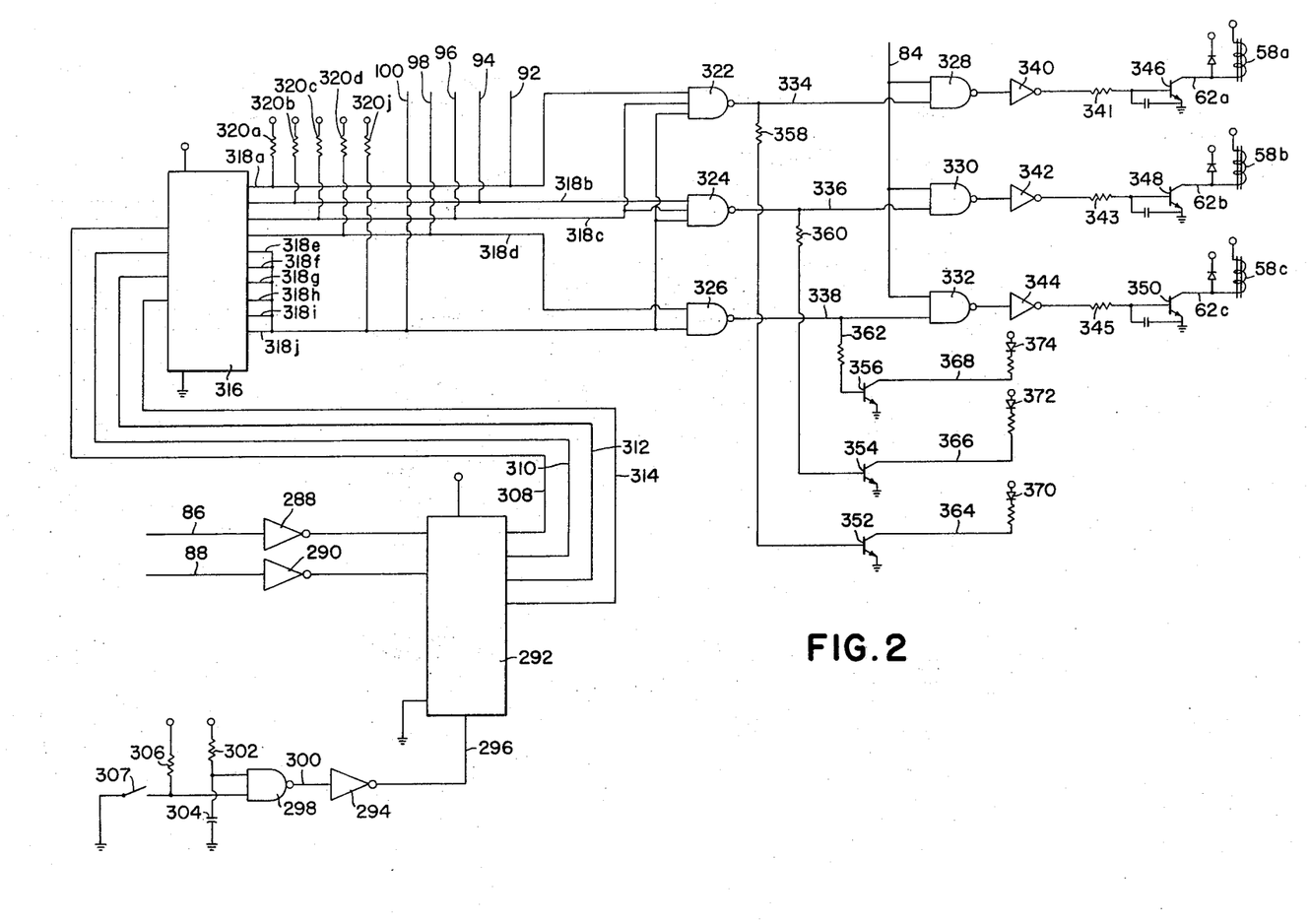
FIG. 2 is a schematic illustration of the circuitry for the weight selector and lifter control unit used in the fuel weighing system according to the present invention; and, FIGS. 3a and 3b, taken together, are a schematic illustration of the circuitry of the master control unit for the fuel weighing system according to the present invention.

The circuitry of the weight selector and lifter control unit is illustrated in FIG. 2, and as can be seen therein, the count-up lead 86 is connected to the input of an inverter 288 and the count-down lead 88 is connected to the input of an inverter 290. The outputs of the inverters 288 and 290 are connected to inputs of an up-down counter 292. Another input of the up-down counter is connected to the output of an inverter 294 by a lead 296 and the input of the inverter 292 is connected to the output of a nand gate 298 by a lead 300. One input of the nand gate 298 is connected to a positive voltage source through a resistor 302 and to ground through a capacitor 304. The second input of the nand gate 298 is connected to a positive voltage source through a resistor 306 and to a manual reset switch 307 is connected across the input to ground. The inverter 294 and nand gate 298 are for the purpose of resetting the up-down counter to zero, the capacitor 304 assuring that the up-down counter 292 is reset to zero when the power is first turned on and the manual reset switch providing a means to reset whenever desired. The up-down counter is set to zero each time the power is turned on so that the system starts with the smallest weight and works up to the proper weight or combination rather than starting with a large combination and working down. In this manner, the system works through shorter cycles to find the proper weight or combination of weights.

As indicated by its name, the up-down counter 292 will count up or down depending upon the outputs of the nand gates 288 and 290 and provides a binary coded decimal output of its count through leads 308, 310, 312 and 314 which carry the proper logical ones and zeros to indicate a count anywhere from zero to nine. The leads 308–314 are connected to a binary coded decimal to one of ten decoder 316. The binary coded decimal to one of 10 decoder grounds one of ten leads 318a-318j depending upon the input. As mentioned above, only five of the seven possible combinations of the three weights 50 are to be used in the fuel weighing system and therefore the leads 3183-318j are connected in parallel to function as one lead 318j. The leads 318a-318d and 318j are all connected to a positive voltage source through resistors 320a-320d and 320j and are also connected to the sample size signal leads 92–100 respectively.

The lead 318a provides one input to a nand gate 322, the lead 318b provides one input to a nand gate 324, the lead 318c provides a second input for each of the nand gates 322 and 324, the lead 318d provides a first input to a nand gate 326, and the lead 318j provides a second input for the nand gate 326 and a third input for each of the nand gates 322 and 324. The outputs in the nand gates 322, 324, and 326 are connected to one input of nand gates 328, 330 and 332, respectively, by leads 334, 336 and 338 respectively. The second input of each of the nand gates 328, 330 and 332 is connected to the lift weights signal lead 84. The outputs of the nand gates 328, 330 and 332 are connected to the inputs of inverters 340, 342 and 344 whose outputs are connected through resistors 341, 342 and 345 to transistors 346, 348 and 350. The emitters of the transistors 346, 348 and 350 are connected to ground and their collectors are connected to a positive voltage source through the leads 62a-62c and the solenoids 58a-58c, respectively, so that when the logical output of the inverters 340–344 is a logical one, the transistors are saturated or turned on and the solenoids 58a-58c activated.

To provide a visual indication of which weights are to be lifted during the upcoming cycle, the leads 334, 336 and 338 are connected to the bases of transistors 352, 354 and 356 through resistors 358, 360 and 362 respectively. The emitters of transistors 352, 354 and 356 are connected to ground and the collectors thereof are connected to a positive voltage source through leads 364, 366 and 368 respectively and light emitting diodes 370, 372 and 374.

The operation of the weight selector and lifter control unit should be obvious from the schematic illustration of the circuitry, but is essentially as follows. The up-down counter 292 provides a binary coded decimal signal to the binary coded decimal to one of ten decoder 316 which grounds one of the lines 318a-318d and 318j. For example, if the count of the up-down counter 292 is zero, the binary coded decimal to one of ten decoder 316 will ground the lead 318a so that the signal in the line 318a is a logical zero and the signals in the lines 318c and 318d which provide the second and third inputs to the nand gate 322 are logical ones. This provides a logical one output from the nand gate 322 which will act on the base of transistor 356 to trigger or turn on the transistor 356 and permit current flow through the light emitting diode 374 to provide a visual indication of which weight will be lifted as soon as the signal in the lift weights signal lead 84 is a logical one. The logical one output of the nand gate 322 provides a logical one input to the nand gate 328 so that as soon as the signal in the lift weights signal lead 84 is a logical one, the nand gate 328 provides a logical zero output which is inverted by the inverter 340 to a logical one which acts on the base of transistor 346 to turn on or trigger the transistor 346 and activate the solenoid 58a so that the smallest weight is raised.

If the count of the up-down counter 292 reaches four, the lead 318j is grounded so that all three nand gates 322, 324 and 326 provide a logical one output and all three light emitting diodes 370, 372 and 374 are lit. Also, as soon as the signal in the lift weight signal lead 84 becomes a logical one, all three solenoids 58a, 58b and 58c are activated so that all three weights are lifted.

In the drawings and in the foregoing description of construction and operation of the fuel weighing system, the digital multiplying and dividing circuits have only been shown generally since circuits for multiplying and dividing are well known to those skilled in the art.

From the drawings and the foregoing description, it can be seen that the present invention provides a novel fuel weighing system which automatically performs all necessary functions with the exception of taking down the final reading of brake specific fuel consumption and which automatically recycles to provide continuous tests of fuel consumption.

Having described a single preferred embodiment of the invention, various modifications within the spirit and scope of the invention will become apparent to those skilled in the art. Therefore, the invention should not be limited by a specific disclosure, but only by the scope of the following claims.

I claim:

1. A system for determining the brake specific fuel consumption of an engine under test comprising: first computator means sensitive to the load on and the speed of the engine to compute engine horsepower and provide a horsepower output signal; a fuel supply means for the engine providing a fuel sample of known size and having a sample size output signal; a timing device having an elapsed time output signal indicating the time required for the engine to consume the sample; second computator means responsive to the output signals of the fuel supply means and timing device to compute fuel consumption in weight/time and provide a fuel consumption output signal; and third computator means responsive to the output signals of the first and second computator means to compute brake specific fuel consumption in weight/horsepower-time and provide a visual display of brake specific fuel comsumption.

2. A system as set forth in claim 1 wherein the fuel supply means includes means for automatically supplying another fuel sample as soon as the last sample is consumed, and the system further includes means to reset the timing device as soon as another fuel sample has been supplied, whereby the system will provide continuous tests of brake specific fuel consumption.

3. A system as set forth in claim 2 wherein the fuel supply means includes means for providing fuel samples of varying sizes and is responsive to the output signal of the timing device to provide the next larger or smaller fuel sample if the time required for the engine to consume the last fuel sample was less than or greater than predetermined minimum and maximum time limits.

4. A system as set forth in claim 3 further including means responsive to the output signal of the timing device to clear the third computator means if the time required for the engine to consume the last fuel sample was less than or greater than the predetermined minimum or maximum time limits whereby erroneous displays of brake specific horsepower will be prevented.

5. An automatic fuel weighing system for performing continuous tests of the fuel consumption of an engine under test, comprising: fuel sample supply means responsive to an input signal to provide a fuel sample of known size and having a sample size output signal; a timing device having an elapsed time output signal indicating the time required for the engine to consume the sample and responsive to an input signal to reset; computator means sensitive to the output signals of the fuel sample supply means and the timing device and responsive to an input signal to compute the fuel consumption in weight/time and provide a visual display thereof; and sensor means responsive to the consumption of one fuel sample by the engine to provide the input signal to the fuel sample supply means and the computator means and to a new fuel sample being provided by the fuel supply means to provide the input signal to the timing device.

6. A fuel weighing system as set forth in claim 5 wherein the fuel supply means includes means for varying the size of the fuel sample and is responsive to the output signal of the timing device to provide a larger or smaller fuel sample if the time required for the engine to consume the last fuel sample is less than or greater than prdetermined minimum and maximum time limits.

7. A fuel weighing system as set forth in claim 6 further including means responsive to the output signal of the timing device to block the input signal to the computator means if the time required for the engine to consume the fuel sample was less than or greater than the predetermined minimum or maximum time limits whereby erroneous displays of fuel consumption are prevented.

8. A fuel weighing system as set forth in claim 7 further including means responsive to the output signal of the time device for providing the input signal to the fuel supply means prior to the complete consumption of the last fuel sample when the output signal of the timing device reaches the predetermined maximum time limit.

9. Apparatus for weighing the fuel consumption of an engine comprising:
A. a balance having a fuel container on one side and weight-receiving means on the other side and including means for providing a signal indicative of the balance and imbalance conditions of the balance;
B. fuel line means connecting the container to a fuel reservoir and an engine;
C. valve means in the fuel line means between the container and reservoir responsive to the presence of a first signal to open;
D. weight means on the weight-receiving means of the balance;
E. lifter means associated with the weight means responsive to the presence of a second signal to remove the weight means from the balance;
F. stop watch means responsive to third and fourth signals to start and stop, respectively;
G. computator means sensitive to elapsed time as indicated by the watch means and the amount of weight removed from the balance to compute fuel consumption in weight/time in response to a fifth signal; and,
H. master control means interconnected with the balance, valve means, lifter means, watch means and computator means responsive to the signal from the balance to sequentially
  i provide the first signal until the fuel in the container is sufficient to create an imbalance to the container side of the balance,
  ii provide the second and third signals as soon as the engine has consumed sufficient fuel to establish a balance between the weight means and the fuel in the container to thereby start the watch means and create an imbalance by the removal of the weight means, and
  iii provide the fourth and fifth signals as soon as the engine has consumed sufficient fuel to again establish a balance.

10. Fuel weighing apparatus as set forth in claim 9 wherein the stop watch means includes means responsive to a further signal to reset, and the master control means includes means which automatically recycles the master control means after providing the fourth and fifth signals and provides the further signal prior to providing the third signal.

11. Fuel weighing apparatus as set forth in claim 9 further including additional computator means sensitive to engine speed, the load on the engine and the fuel consumption as determined by the first-mentioned computator means responsive to the fifth signal to compute brake specific fuel consumption.

12. Fuel weighing apparatus as set forth in claim 9 wherein the stop watch means includes means responsive to a further signal to reset, and the master control means includes means which, upon the master control means providing the fourth and fifth signals, removes the second signal to replace the weight means on the balance, automatically recycles the master control unit a predetermined interval of time after removing the second signal, and provides the further signal prior to again providing the third signal.

13. Fuel weighing apparatus as set forth in claim 10 further including additional computator means sensitive to engine speed, the load on the engine and the fuel consumption as determined by the first-mentioned computator means responsive to the fifth signal to compute brake specific fuel consumption.

14. Apparatus for weighing the fuel consumption of an engine comprising:
  A. a balance having a fuel container on one side and weight-receiving means on the other side and including means for providing a signal indicative of the balance and imbalance conditions of the balance;
  B. fuel line means connecting the container to a fuel reservoir and an engine;
  C. valve means in the fuel line means between the container and reservoir responsive to the presence of a first signal to open;
  D. a plurality of weight members on the weight-receiving means of the balance;
  E. lifter means associated with each of the weight members and each being responsive to the presence of a second signal to remove its associated weight member from the balance;
  F. an up-down counter selector means for blocking the second signal from selected lifter means depending upon its count and responsive to third and fourth signals to count up and down, respectively, one number per signal;
  G. sample size encoder means responsive to the blocking action of the selector means to provide a signal indicative of the sum of the weight members removed from the balance by the lifter means;
  H. stop watch means responsive to fifth, sixth and seventh signals, to start, stop, and reset, respectively;
  I. computator means sensitive to elapsed time as indicated by the watch means and amount of fuel used as indicated by the signal from the sample size encoder to compute fuel consumption in weight/time in response to an eighth signal; and,
  J. master control means interconnected with the balance, valve means, lifter means, selector means, watch means, and computator means responsive to the signal from the balance to, in repeated cycles, i provide the first signal until the fuel in the container is sufficient to create an imbalance,
    ii provide the seventh signal no later than providing the second and fifth signals,
    iii provide the second and fifth signals as soon as the engine has consumed sufficient fuel to establish a balance,
    iv provide the sixth signal as soon as the engine has consumed sufficient fuel to again establish a balance,
    v remove the second signal prior to providing the first signal,
    vi provide the eighth signal if the elapsed time as indicated by the watch means is within predetermined maximum and minimum limits,
    vii provide the third signal if the elapsed time is less than the predetermined minimum time limit, and
    viii provide the fourth signal if the elapsed time reaches the predetermined maximum time limit.

15. Fuel weighing apparatus as set forth in claim 14 wherein the master control means is responsive to the elapsed time as indicated by the watch means reaching the predetermined maximum time limit prior to the time the engine has consumed sufficient fuel to establish a balance to provide the sixth and fourth signals without regard to the amount of fuel consumed by the engine 16. Fuel weighing apparatus as set forth in claim 14 wherein the master control means includes means responsive to the attainment of a balance in less than the predetermined minimum time limit when all the weight members have been removed from the balance to provide the eighth signal rather than the third signal.

17. Fuel weighing apparatus as set forth in claim 14 wherein the master control unit includes means responsive to the conditions calling for the third and fourth signals to blank the computator means and thereby prevent erroneous readings.

* * * * *